No. 812,922. PATENTED FEB. 20, 1906.
W. EPPINGER.
APPARATUS FOR SMOKING AND CURING MEAT PRODUCTS.
APPLICATION FILED NOV. 2, 1904.
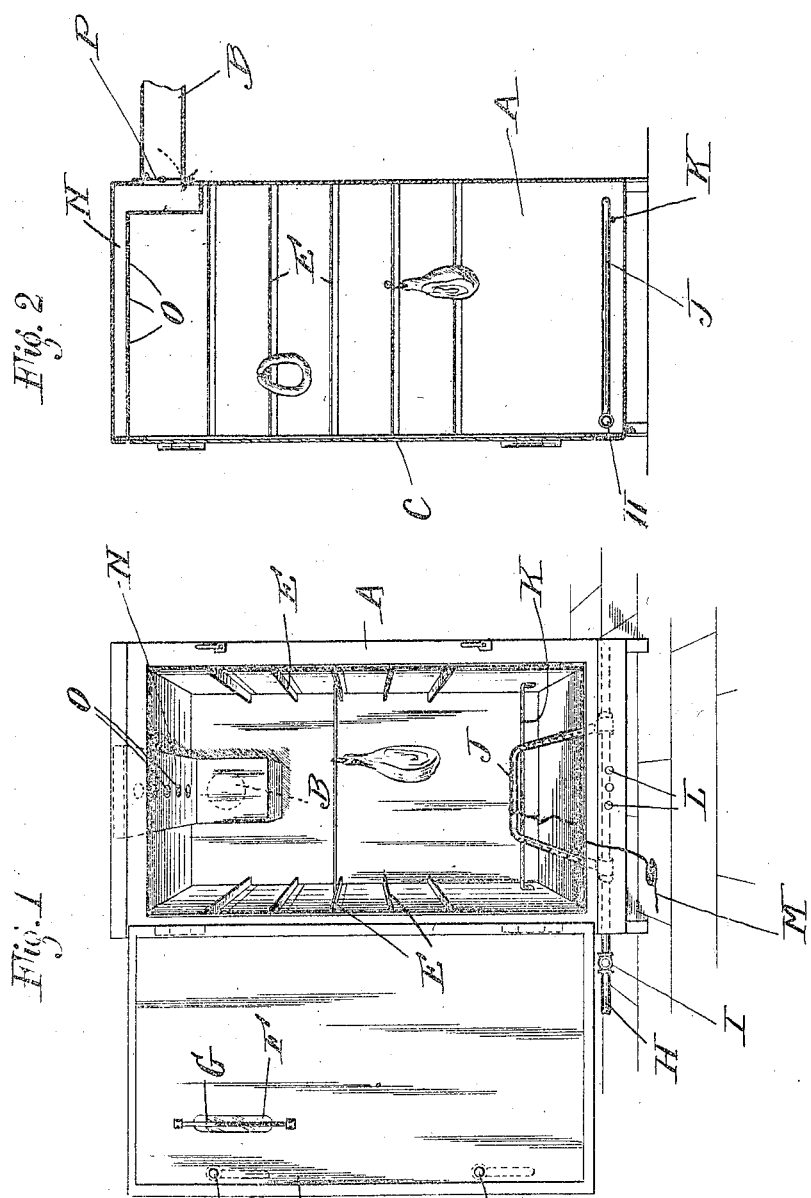

UNITED STATES PATENT OFFICE.

WILLIAM EPPINGER, OF NEW YORK, N. Y.

APPARATUS FOR SMOKING AND CURING MEAT PRODUCTS.

No. 812,922.     Specification of Letters Patent.     Patented Feb. 20, 1906.

Application filed November 2, 1904. Serial No. 231,038.

*To all whom it may concern:*

Be it known that I, WILLIAM EPPINGER, a citizen of the United States, residing at New York, in the county of New York and State of New York, have invented a new and useful Apparatus for Smoking and Curing Meat Products, of which the following is a specification.

The ordinary process of smoking or curing meat products—such as sausages, hams, &c.—consists in building a wood fire, usually out of hickory or oak chips and shavings, in a compartmment or smoke-house, and after such fire has reached a smouldering condition in placing the meat products in such compartment for a sufficient time to allow them to be slightly cooked and smoked to acquire the flavor of the smouldering wood fire. This has been found to be a slow, expensive, and irregular process, because it takes considerable time to bring the fire to the right condition, because the heat of the smouldering fire is not very great, and because different fires will necessarily be different in cooking and smoking properties.

I have discovered that meat products can be cured and smoked in a much more satisfactory and expeditious way by subjecting them in a closed compartment or smoke-house to the heat and products of combustion of ordinary illuminating-gas burned in the ordinary way unmixed with air until it issues from the jets, as in the ordinary illuminating-burners which give a yellow or illuminating flame, or with an unsatisfied combustion as distinguished from the Bunsen burners, in which air is mixed with the gas before combustion, giving a colorless or complete combustion. By treating the meat products in this way the same are cooked and an appetizing smoky flavor is imparted to the same. Moreover, as gas-flames are easily regulable the cooking and curing processes can be much more accurately performed than over a smouldering wood fire.

In some instances where a wood fire is particularly desired the meat products are subjected for a small part of the last part of the process to the action of such fumes.

The present invention covers an apparatus which has been especially designed to carry out such process in an expeditious and simple manner and in such way that all the products contained within the apparatus will be uniformly treated.

The accompanying drawings show an apparatus arranged for practicing the invention.

Referring to said drawings, Figure 1 is a front elevation of the apparatus, and Fig. 2 is a cross-sectional view.

In detail, A designates a box or compartment, leading from which is an outlet or escape-pipe B. The box has a hinged door C, which can be tightly closed by locks D. Arranged in the box are ribs or projections E, on which may be placed poles or bars, to which the meat products are hung or on which may be slid perforated trays carrying the meat products. The door C has an opening F, which is filled with glass, and inside of the door is arranged a thermometer G, by which the temperature inside of the box can be watched. A gas-pipe H, having a suitable valve or pipe I, extends into and across the front lower portion of the box. Pivoted on this pipe is a looped pipe J, which is perforated, or which is provided with suitable nipples or burners projecting therefrom. The ends of this looped pipe J are pivoted on the pipe H between collars, and communication is made through these ends so that the nipples will always receive a supply of gas from the pipe H.

K designates a support for the looped pipe J.

A chain or wire rope M is connected to the rear part of the looped pipe J.

Small draft-holes L are arranged in the front lower portion of the box. Inside of the top of the box is arranged a draft-tube N, connecting with the escape-pipe B. This draft-tube has suitable holes O arranged along it lengthwise, so that the outlet will be the same both at the front and the rear of the box, whereby all the meat products will be treated to the same degree of heat and smoke.

A weighted damper P is pivoted in the escape-pipe B. This damper is preferably perforated and fits somewhat loosely into the escape-pipe normally to restrict the escape to a small amount, but so as to open automatically when the pressure or draft becomes too great in the box or compartment.

The apparatus is used as follows: The meat products are placed in position in the box or compartment. The looped pipe J is raised, the gas turned on in the pipe H, and the issuing jets from the nipples are ignited. The looped pipe J is then lowered to position. This will give a series of small ordinary yellow gas-flames across the box. The door is then closed and the valve I operated to get the proper temperature inside of the compartment. The heat and products of combustion from the flames will soon create a dense smoke inside of the compartment which will cook and smoke the meat products. The draft-holes being small the combustion will be in some measure an unsatisfied one, which will give a smoky flavor to the meat products. By reason of the perforated draft-tube N the cooking and curing will be the same on all the products, both in the front and the rear of the box. As the smoke becomes too dense the damper P will slightly lift and will allow a small escape of the smoke and products of combustion, so as to enable the process to be carried on until the meat products reach the right condition. If desired, at the completion of the process the door is opened and a few shovelfuls of sawdust or chips thrown in on top of the gas-pipes to impart a smoky wood flavor to the meat products. After the charge has been sufficiently cooked and smoked the gas is turned off and the small fire, if one is used, is allowed to go out, so that when the door is opened to withdraw the cured meat products there will be very little smoke or fumes. A serious objection to the ordinary smoke-house using a wood fire entirely is that it is necessary to open the door before the fire is out, allowing the fumes to escape, which often causes complaint to be made in the neighborhood and action taken by the authorities. The pivoted construction of the looped gas-pipe allows the same to be lifted up through the ashes and sawdust from the wood when the nipples are to be re-ignited for the next charge.

The details of the apparatus herein shown and described may be varied by a skilled mechanic without departing from the scope of my invention as expressed in the claims.

Having thus fully described my invention, what I claim, and desire to secure by Letters Patent of the United States, is—

1. An apparatus for curing meat products, consisting of a closed compartment having a door and also an outlet, a valved gas-pipe extending within said compartment and provided with a series of burners near the floor of the compartment, through which gas issues unmixed with air, said compartment being provided with an air-inlet restricted in size relatively to the capacity of the burners and the pressure of gas so that only sufficient air is admitted to support combustion, whereby smoky flames are produced at the burners for the purposes set forth.

2. An apparatus for curing meat products, consisting of a closed compartment provided with a door and also an outlet, a gas-pipe extending across the front of the compartment near the door and the floor, a branch pipe connected to said pipe at a point within the compartment and extending rearward into the compartment near the floor, said branch pipe being provided with burners and being adapted to swing upward and forwardly to near the door-opening, for the purposes set forth.

3. An apparatus for curing meat products consisting of a closed compartment having a door, a gas-pipe connected to the bottom of said compartment, and a looped pipe pivoted thereto and having a series of burners from which the gas issues unmixed with air.

4. An apparatus for curing meat products consisting of a closed compartment provided with a door and an outlet and also with a restricted air-inlet, a number of gas-burners in the bottom thereof, from which the gas issues unmixed with air, an escape-flue extending therefrom, and an automatic damper in the escape-flue, whereby the gas is consumed with an unsatisfied combustion and the meat products are cured by the products of combustion.

5. An apparatus for curing meat products consisting of a closed compartment provided with a door and an outlet and also with a restricted air-inlet, a number of gas-burners in the bottom of the compartment from which the gas issues unmixed with air, a perforated draft-tube extending across the top of the compartment, and an escape-pipe connected with the draft-tube, whereby the gas is consumed with an unsatisfied combustion and the meat products are cured by the products of combustion.

6. An apparatus for curing meat products consisting of a closed compartment having means for holding meat products therein, said compartment being provided with a door and an outlet and also with a restricted air-inlet a number of gas-burners in the bottom of said compartment from which the gas issues unmixed with air, a perforated draft-tube extending across the top of said compartment, an escape-pipe connected with said draft-tube, and an automatic damper in said escape-pipe, whereby the gas is consumed with an unsatisfied combustion and the meat products are cured by the products of combustion.

In testimony whereof I have hereunto set my hand in the presence of two subscribing witnesses.

WILLIAM EPPINGER.

Witnesses:
FRANK HIMMEL,
GEORGE HEINRICKEL.